United States Patent [19]
Brandt

[11] 4,071,045
[45] Jan. 31, 1978

[54] CHECK VALVE CONSTRUCTION

[75] Inventor: Theodore C. Brandt, Tyler, Tex.

[73] Assignee: General Electric Company, Louisville, Ky.

[21] Appl. No.: 720,580

[22] Filed: Sept. 7, 1976

[51] Int. Cl.² ............................................. F16K 15/04
[52] U.S. Cl. ................................ 137/528; 137/533.11
[58] Field of Search ................. 137/515, 515.5, 519.5, 137/532–533.31, 539, 543.19, 543.21, 528; 285/319

[56] References Cited

U.S. PATENT DOCUMENTS

| 2,550,591 | 4/1951 | Parsons | 285/319 |
|---|---|---|---|
| 2,684,080 | 7/1954 | Crowell | 137/515.5 |
| 2,918,083 | 12/1959 | Clark | 137/515.5 |
| 2,989,299 | 6/1961 | Modrich | 137/533 X |
| 2,996,077 | 8/1961 | Taggert | 137/539 X |
| 3,323,560 | 6/1967 | Ehlers | 137/533.13 X |
| 3,421,547 | 1/1969 | Aslan | 137/539 |
| 3,921,662 | 11/1975 | Hauffe | 137/515 |

FOREIGN PATENT DOCUMENTS

| 1,456,510 | 9/1966 | France | 137/543.19 |
|---|---|---|---|
| A69,446 | 7/1958 | France | 137/493 |

*Primary Examiner*—Robert G. Nilson
*Attorney, Agent, or Firm*—Frank P. Giacalone; Francis H. Boos

[57] ABSTRACT

A one-way ball check valve arranged in a tube so that minimum point contact is maintained between the moving ball valve member and the surrounding stationary portions of the valve so as to prevent malfunction of the valve due to surface tension therebetween. The ball valve is contained in an enclosure having relatively flat guide portions that permits minimum contact with the ball valve surface during movement between its closed and open position. The closed end portion of the enclosure is provided with a dimple that affords minimum point contact with the ball valve when it is in the open position.

5 Claims, 7 Drawing Figures

U.S. Patent     Jan. 31, 1978     4,071,045
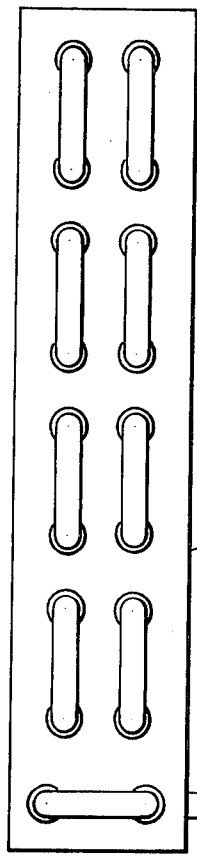
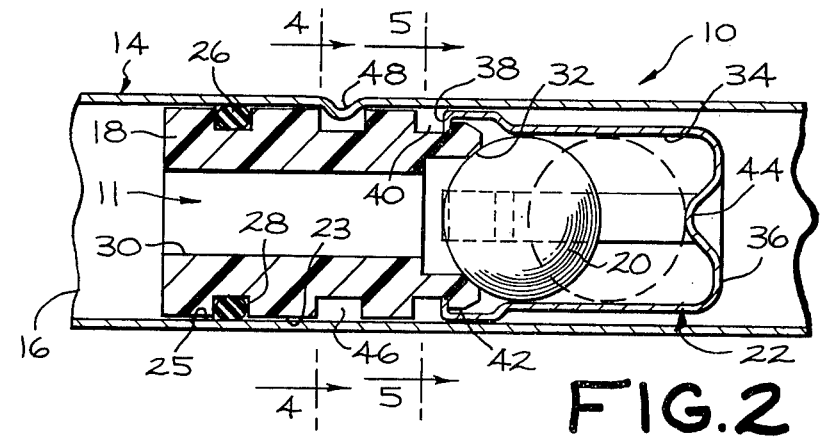
FIG.2
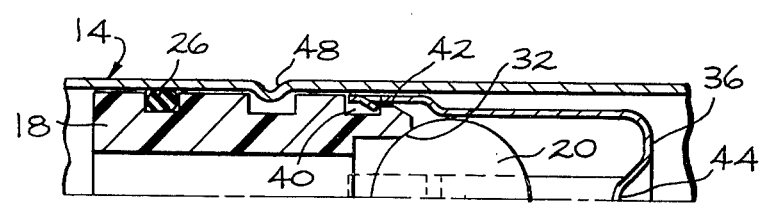
FIG.7
FIG.1
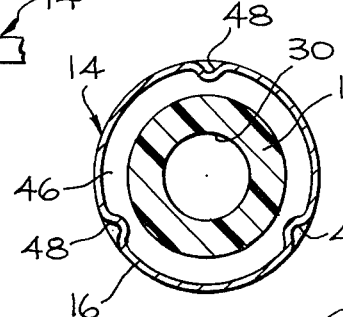
FIG.4
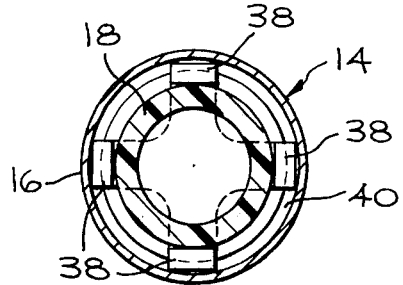
FIG.5
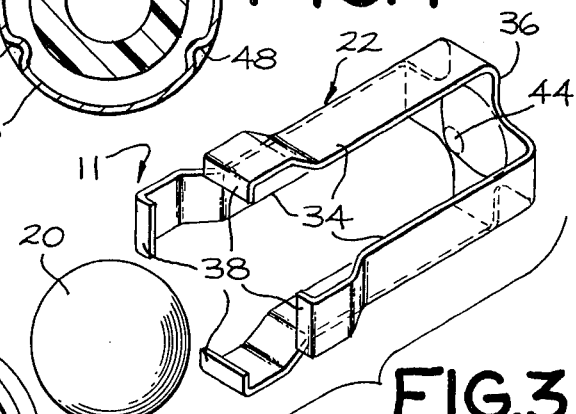
FIG.3
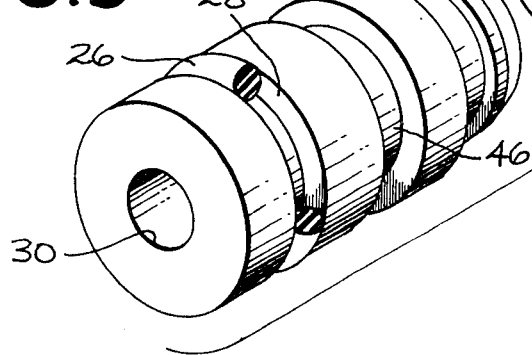
FIG.6

CHECK VALVE CONSTRUCTION

BACKGROUND OF THE INVENTION

1. Field of the Invention

The present invention relates to a check valve arranged in a tube section of a refrigeration system, however, it should be noted that the valve of the present embodiment may be arranged in tube portions used in other applications. Check valves are generally employed in refrigeration systems when it is necessary to limit refrigerant flow in only one direction. Valves, when employed in refrigeration systems are usually self-contained assemblies that are soldered or secured to a portion of the refrigeration system. The valve accordingly requires that joints be made at the inlet and outlet end of the valve. This procedure requires the extra steps of making and testing the two joints during the manufacturing operation of the refrigeration system. Further, it leaves the system with additional potential weak points since most of the leak problems in a hermetic refrigeration system occur in the joint areas.

2. Description of the Prior Art

The present practice check valves, when provided for installation in refrigeration systems, may be of the type disclosed in U.S. Pat. Nos. 3,059,667—Coceano, 3,561,472—Lam and 3,724,496—Secrist. Generally, these valves are manufactured and assembled as self-contained, separate valve assemblies that are subsequently joined in an appropriate manner to a tubing or pipe system. The use of self-contained or independent valves requires that all of the necessary valve components to be specifically designed for each particular valve assembly. Further, the installation of these valves in a refrigeration system generally require that two separate joints representing the inlet and outlet be made.

Another type of check valve used in conjunction with the refrigeration systems may be of the type disclosed in U.S. Pat. Nos. 3,096,825—Clark and 3,620,228—Schmid. Generally, these valves use a portion of the tubing or piping system as part of the valve. It should be noted, however, that the part of the system used as a portion of the valve must be modified and dimensioned to accommodate the valve parts. In effect, while the valve system is insertable in a pipe or tubing, it nevertheless is necessary to modify the pipe or tubing to accommodate the valve parts.

Still another type of check valve used in conjunction with the refrigeration systems may be of the type disclosed in U.S. Pat. No. 2,723,679—Harris et al. Generally, this type of valve is neither self-contained nor does it use part of the tubing or piping systems as part of the completed valve assembly. The valve disclosed in the Harris patent requires the fabrication of specially designed components that are assembled in a conduit. The components of the valve and valve body forming portions of the conduit and piping are dimensioned and fabricated to form the completed valve. In effect, the valve components are fabricated and assembled in much the same manner as self-contained valves in that all of the components of the valve are specially designed to operate together as a complete valve.

SUMMARY OF THE INVENTION

By this invention there is provided a one-way ball check valve and more particularly, a valve system arranged in a tube section of a hermetic refrigeration system. A substantially cylindrical valve body member having a centrally extending passageway is arranged in a section of tubing. A first annular groove in the body member accommodates a sealing ring member that prevents leakage of refrigerant between the valve body and the inner wall of the tubing.

A valve cage includes circumferentially-spaced, axially-extending guide members connected together at one end to form a cap portion. Tab portions extending radially inwardly from the other ends of the guide members are received in a second annular groove formed in the body member so that the cage is positioned relative to said body member.

A third annular groove formed in the valve body accommodates holding projections that extend inwardly from the tubing wall to secure the valve body relative to the tubing. Located in the cage is a ball valve member operable under action of the refrigerant to move between a closed position on a valve seat formed at the end of the passageway in the valve body and an open position against the cap portion of the cage.

It is an object of the present invention to provide a valve that utilizes a portion of the system tubing as a valve component.

Another object of the present invention is to provide a valve system that is arranged in the refrigeration system through a normally open end portion of the system tubing prior to joining the open ends.

Still another object of the invention is the provision of a valve that will maintain minimum contact between the movable valve member and the cooperating stationary components of the valve.

BRIEF DESCRIPTION OF THE DRAWINGS

FIG. 1 is a fragmentary view showing a portion of a refrigeration system incorporating the valve of the present invention;

FIG. 2 is a sectional view showing the valve assembly of the present invention;

FIG. 3 is an exploded perspective view showing details of construction;

FIG. 4 is a sectional view taken along lines 4—4 of FIG. 2;

FIG. 5 is a sectional view taken along lines 5—5 of FIG. 2;

FIG. 6 is a fragmentary perspective view showing a second embodiment of the invention; and FIG. 7 is a detail view of the second embodiment.

DESCRIPTION OF THE PREFERRED EMBODIMENT

Referring to the drawings, there is illustrated a valve 10 of the type adapted to be inserted in a section of tubing forming part of a refrigeration system. The refrigeration system typically includes a heat exchanger 12 connected by a conduit or tubing 14 to other components (not shown) that comprise the complete system. With reference to FIG. 2, there is shown a section of tubing 16 which houses the valve 10. As will be explained hereinafter, the valve 10 is assembled through the open end 13 portion of a tube section. Accordingly, the tube section 16 which houses the valve 10 may represent the open or free end of heat exchanger 12 or of conduit 14 prior to their being joined. It should further be understood that the section 16 may represent any tube end portion of the refrigeration system wherein the use of a valve 10 would be appropriate relative to the operation of the system.

The valve 10 comprises an assembly portion 11, including a body member 18, a movable ball valve 20, and a cage or valve retainer 22. The body member 18 is substantially cylindrical in cross-section and is arranged as shown in the tube section 16. To facilitate its insertion in the tube 16, the outer diameter of the member 18 is slightly less than the inner diameter of tube section 16.

Means are provided to prevent leakage of refrigerant through the clearance provided between the outer wall 23 of member 18 and the inner wall 25 of tube section 16. To this end a sealing ring 26 is arranged in a first annular groove 28 formed in the outer wall 23 of member 18. As best seen in FIG. 2, sealing ring 26 is dimensioned to engage the inner wall 25 of tube section 16 to provide an effective seal between walls 23 and 25.

Refrigerant flow through the valve 10 is provided by a centrally arranged passageway 30 extending axially through the member 18. Formed around the periphery of one end of passageway 30 is a valve seat 32 that is dimensioned to receive the ball valve 20 in a sealing relationship. The seal between ball valve 20 and seat 32 may be further enhanced if the member 18 is resilient relative to the ball valve 20.

Movement of the ball valve 20 between the closed position shown in full and the open position shown in dotted lines in FIG. 2 is controlled by the retaining cage 22. The cage 22 is defined by a plurality of axially-extending ribs or guide members 34 which are joined together at one end to define an end cap portion 36. The cage 22 includes means for mounting and holding it against movement relative to member 18. In the present embodiment, these holding means comprise tab portions 38 formed on the other end of the guide members 34. The tab portions 38 are bent substantially perpendicular to the ribs 34 and extend radially inwardly thereto. The cage 22 and more specifically the ribs 34 are arranged and dimensioned radially so that tabs 38 snap into a second annular groove or holding recess 40 formed in the outer wall 23 of member 18. Alternatively as shown in FIG. 6, the means for mounting and holding the cage 22 against movement relative to member 18 may be in the form of a lanced tab portion 38' that are formed to project radially inwardly into engagement with the groove 40. The outer wall area of member 18 defined between the groove 40 and the end portion of member 18 adjacent wall seat 32 has a diameter less than the wall 23 to provide a recess area 42. The portions of ribs 34 arranged between the valve end of member 18 and groove 40 are therefore arranged in the area 42 and generally within the diameter defined by outer wall 23 of member 18. The axial dimensions of the ribs 34 allow controlled movement of the valve member 20 between its closed and open positions.

In valves employed in controlling fluid flow in hermetic systems, point contact between components is desirable since line contact may result in possible malfunction due to surface tension and when impurities in the fluid become lodged between the stationary components and the movable valve. Means are provided by the present invention that allows only minimum point contact between the surface of movable ball valve member 20 and the surface of the stationary cage member 22 both during movement of the valve 20 and in its open position against end portion 36. During movement of the ball valve 20, point contact between the valve 20 and ribs 34 is assured since the ribs as shown in FIG. 3 provide a flat wall portion for the spherical wall surface of the ball to contact. Point contact when the ball is in its open position is provided by a spheroconic shape dimple 44 formed in the end portion 36 of cage 22. The dimple 44 projects axially toward the valve seat 32. As shown in FIG. 2, the ball valve 20 shown in dotted lines makes minimum point contact with the dimple 44 when the valve 20 is in its open position. While four equally spaced members 34 are shown it should be noted that the exact number is not critical. It is necessary, however, that the space between the members be dimensioned relative to the ball diameter so as to prevent contact between ball 20 and wall 25 during valve operation.

In summary, in assembling the valve 10 the cage 22 is placed on member 18 with ball valve 20 trapped therein. The assembly 11 comprising member 18, ball valve 20, and cage 22, is then inserted into the open end of tube section 16 with the end portion 36 leading. To facilitate the insertion of cage 22, the valve may be inserted into the flared or female open end portion of tubing 14 that forms a joint of the refrigeration system. The assembly is located in the section 16 in any convenient manner such as a gage and is then secured against movement. To this end a third groove or holding means 46 is formed in the outer wall 23 of member 18. The holding means 46 may be a recess, as shown, or may be spaced indentations for receiving individual projections or alternatively the projections 48 may be formed to deform and hold the member 18 without providing a recess on member 18. After the assembly 11 is properly located in the tube section 16, a crimping tool or other appropriate device forms a plurality of radially inwardly projecting tabs or holding members 48 in the wall of tube section 16 that are dimensioned to enter the groove 46 and prevent movement of valve assembly 11 relative to the tube section 16. After the assembly 11 is secured in tube section 16 by the tabs 48 to complete the installation of the present embodiment of the valve, the tube section 16 is then joined to the open end portion of another tube to be thus incorporated into a hermetic refrigeration system.

Referring now to FIGS. 6 and 7 in assembling this embodiment of the invention, body member 18 including the sealing ring 26 may be inserted into the tube portion 16 prior to placing and securing the cage 22 on the body member 18. This method of assembling the valve 10 is possible because the lanced tabs 38' will enter area 42 and then snap into groove 40 as shown in FIG. 7. This arrangement allows for leak testing between the ball and valve seat and between walls 23 and 25 prior to assembling the complete valve including cage 22.

The foregoing is a description of the preferred embodiment of the invention and variations may be made thereto without departing from the true spirit of the invention, as defined in the appended claims.

What is claimed is:

1. A one-way ball check valve arranged in a refrigerant carrying tube member comprising:
    a substantially cylindrical body member positioned in said tube member having an outer diameter less than the inner diameter of said tube member;
    a centrally arranged passageway extending axially through said body member;
    a valve seat arranged on one end of said axial passageway;
    a first and second annular groove in said body member;

an annular sealing means arranged in said first groove engaging the inner wall of said tube to prevent refrigerant from leaking past said body member;

a valve cage in said tube member including circumferentially spaced axially extending guide members connected together at one end to form a cap portion;

a contact portion formed integral with said cap portion and projecting axially toward said valve seat;

tab portions extending radially inwardly from the other end of said guide members;

tab receiving means arranged in said body member for receiving said tab portions for holding said cage and said body member and for positioning said end cap portion relative to said valve seat;

a plurality of circumferentially spaced holding means formed in said tube member projecting radially inwardly into engagement with said second groove in said body member for preventing movement of said body member relative to said tube member; and a valve member arranged in said valve cage being operable under action of said refrigerant between a closed position on said valve seat and an open position in point contact against said contact portion.

2. The one-way ball check valve as recited in claim 1 wherein said valve member is a ball valve and said axially-extending guide members include a substantially flat inner surface so that minimum point contact is provided between said ball and said surface during movement of said ball between its open and closed position.

3. The one-way ball check valve as recited in claim 2 wherein the space between said axially-extending guide members is effective in maintaining the outer surface of said ball member within the outer diameter of said valve cage when said ball moves between said guide members.

4. The one-way ball check valve as recited in claim 3 wherein the free end portions of each guide member is bent to provide tab portions extending radially inwardly to engage said second annular groove.

5. The one-way ball check valve as recited in claim 3 wherein the free end portion of each guide member is lanced to provide a tab portion extending radially inwardly to engage said second annular groove.

* * * * *